United States Patent
Jaekel

(10) Patent No.: US 6,349,991 B1
(45) Date of Patent: *Feb. 26, 2002

(54) SEAT, IN PARTICULAR CAR SEAT

(75) Inventor: Steffen Jaekel, Hiddenhausen (DE)

(73) Assignee: Bertrand Faure Sitzechnik GmbH & Co. KG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/453,208

(22) Filed: Dec. 3, 1999

(30) Foreign Application Priority Data

Dec. 8, 1998 (DE) .......................................... 198 56 561

(51) Int. Cl.⁷ ................................................ A47C 3/025

(52) U.S. Cl. .................................. 297/284.2; 297/284.6

(58) Field of Search ........................... 297/284.2, 284.3, 297/284.4, 284.6, 284.1

(56) References Cited

U.S. PATENT DOCUMENTS

| | | | | |
|---|---|---|---|---|
| 4,514,010 A | * | 4/1985 | Sabater Gonzalez . | 297/284.6 X |
| 4,615,563 A | * | 10/1986 | Kobayashi ............... | 297/286.4 |
| 4,792,186 A | * | 12/1988 | Benjamin et al. ........ | 297/284.6 |
| 5,860,699 A | * | 1/1999 | Weeks .................. | 297/284.3 X |
| 5,860,705 A | * | 1/1999 | Ridder ................ | 297/284.6 X |
| 5,934,752 A | * | 8/1999 | Klinger ................. | 297/284.4 |
| 5,975,636 A | * | 11/1999 | Koch et al. .......... | 297/284.6 X |

FOREIGN PATENT DOCUMENTS

| | | | |
|---|---|---|---|
| DE | 198 06 535 | 8/1998 | |
| SU | 1237495 | * 6/1986 | ............. 297/284.3 |

* cited by examiner

Primary Examiner—Laurie K. Cranmer
(74) Attorney, Agent, or Firm—Connolly Bove Lodge & Hutz LLP

(57) ABSTRACT

In a seat, particularly a car seat, having a seat portion and a backrest, a pressure element is located in the rear of the seat portion and in the lordotic area of the backrest which can be used to adjust the firmness of the seat and, where applicable, the contour of the areas of the seat covering the pressure elements. Both pressure organs can be adjusted only in tandem with each other.

8 Claims, 5 Drawing Sheets

SEAT, IN PARTICULAR CAR SEAT

BACKGROUND OF THE INVENTION

The present invention concerns a seat, having a backrest with a pressure element.

A known seat of this type (for example, from D.E. 198 06 535 A1) exhibits a number of pressure elements located in both the seat portion as well as the backrest. The pressure elements are chambers that can be filled with a fluid. To enhance the comfort of the occupant, the fluid within each chamber should be adjusted to a pressure that corresponds to the physical characteristics of the person using the seat and his position on the seat. Since, in the case of the known car seat, a large number of chambers are provided that can be filled, individual manual adjustment of the pressure within each chamber is difficult and time-consuming. For this reason, and also to enable the chamber pressures to be adjusted easily and quickly when the seating position of the occupant changes, adjustments in pressure within the various chambers are done automatically in the known seating system, depending on the specific circumstances of the load of each chamber. This type of individual, load-dependent adjustment in the various seat and backrest areas often proves to have drawbacks from an orthopedic viewpoint:

The most important consideration for a healthy sitting posture is the positioning of the spine and pelvis. The manner in which the pelvis is angled affects the curve of the spine in the lumbar area. This is not the only consideration to be taken into account when adjusting the seat, as the anatomical peculiarities of the spine of the individual using the seat must also be considered, so that proper orthopedic adjustment of the seat will be achieved equally well, whether the seat occupant has lordosis, kyphosis, or a straight back. For example, in order to counteract the defective position of the spine in lordosis, the pelvis must be tipped to the rear, and no increase in pressure on the lordotic area of the spine is permissible. On the other hand, the adjustment must be just the opposite for kyphosis. Having a number of uncoordinated adjustment settings, such as those provided by the car seat presumed to be known, fails to take these relations into consideration. In fact, it poses the risk that areas might be adjusted in a manner that is contraindicated.

SUMMARY OF THE INVENTION

Proceeding on the basis of this state of the art, the underlying object of the invention is to provide a car seat having pressure elements located in the rear of the seat portion and in the lordotic area of the backrest that can be made adjustable solely in a manner consistent with orthopedic requirements.

By virtue of adjustments to the pressure elements in the rear of the seat portion and in the lordotic area of the backrest being possible only in tandem, a contraindicated adjustment is precluded. Adjustments bringing about less firmness in both pressure elements promote the proper sitting posture for a seat occupant with lordosis, while a firm adjustment of the adjustable areas is suitable for a seat occupant with kyphosis.

Two preferred embodiments are described in detail below with reference to the drawing.

DETAILED DESCRIPTIONS OF THE PREFERRED EMBODIMENTS

Figure 1:
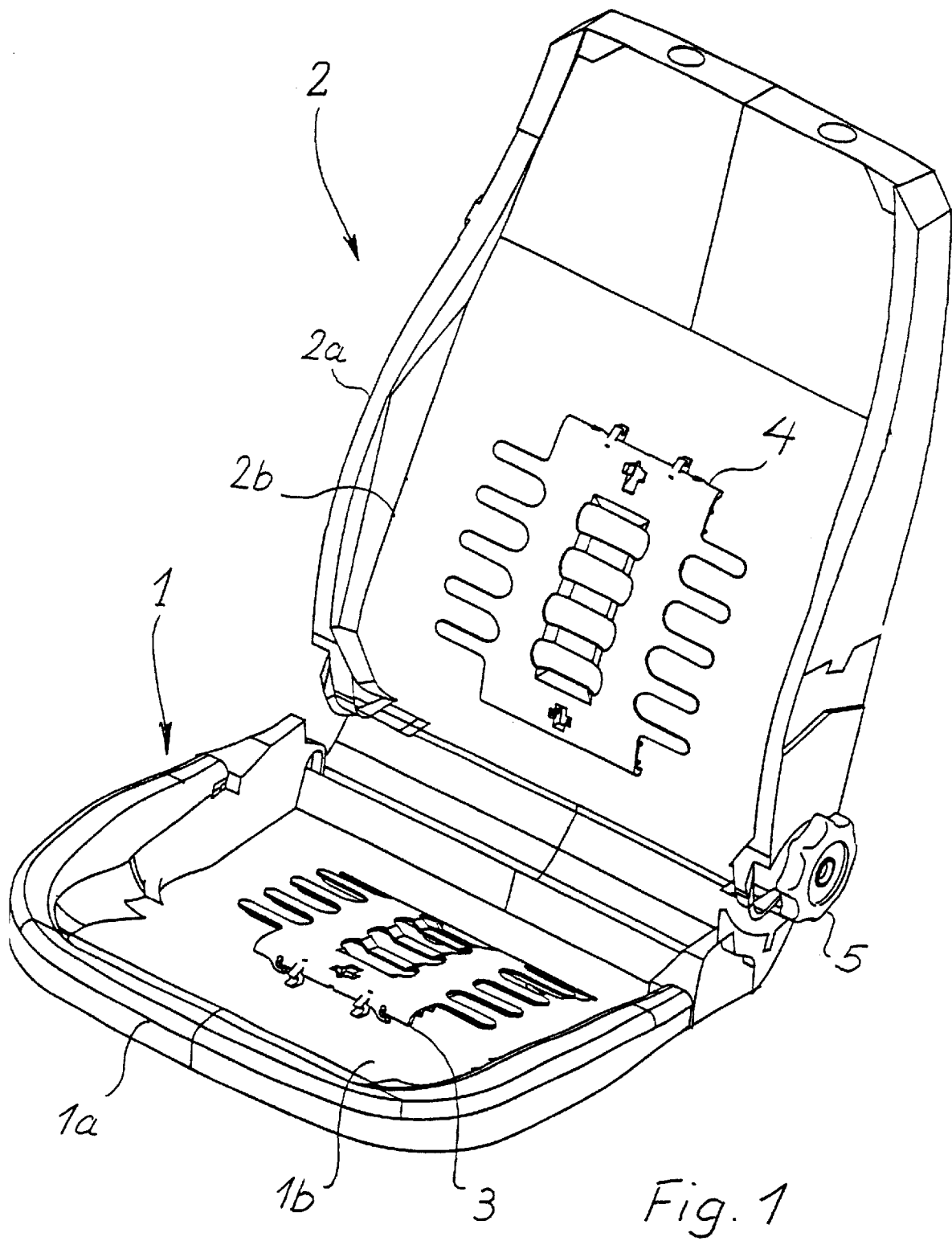
FIG. 1 shows a view in perspective of a seat frame without upholstery, with supports located in the seat portion and in the backrest.

A seat portion indicated in its entirety by 1 has a seat shell 1b and a seat portion frame 1a. The upholstery of the seat portion 1 is not shown in any of the drawings. The seat cover is labeled 1c.

A backrest 2 has a backrest frame 2a and a backrest shell 2b. The upholstery of the backrest 2 is also not shown, with only the backrest cover shown in FIGS. 2 through 5.

The backrest 2 is flexibly joined to the seat portion 1 by means of connection fittings in the known manner, and its angle can be adjusted using a device to change the angle of tilt, whose handwheel 5 is shown.

All embodiments exhibit pressure elements both at the rear of the seat portion 1 and in the lordotic area of the backrest 2.

Figure 2:
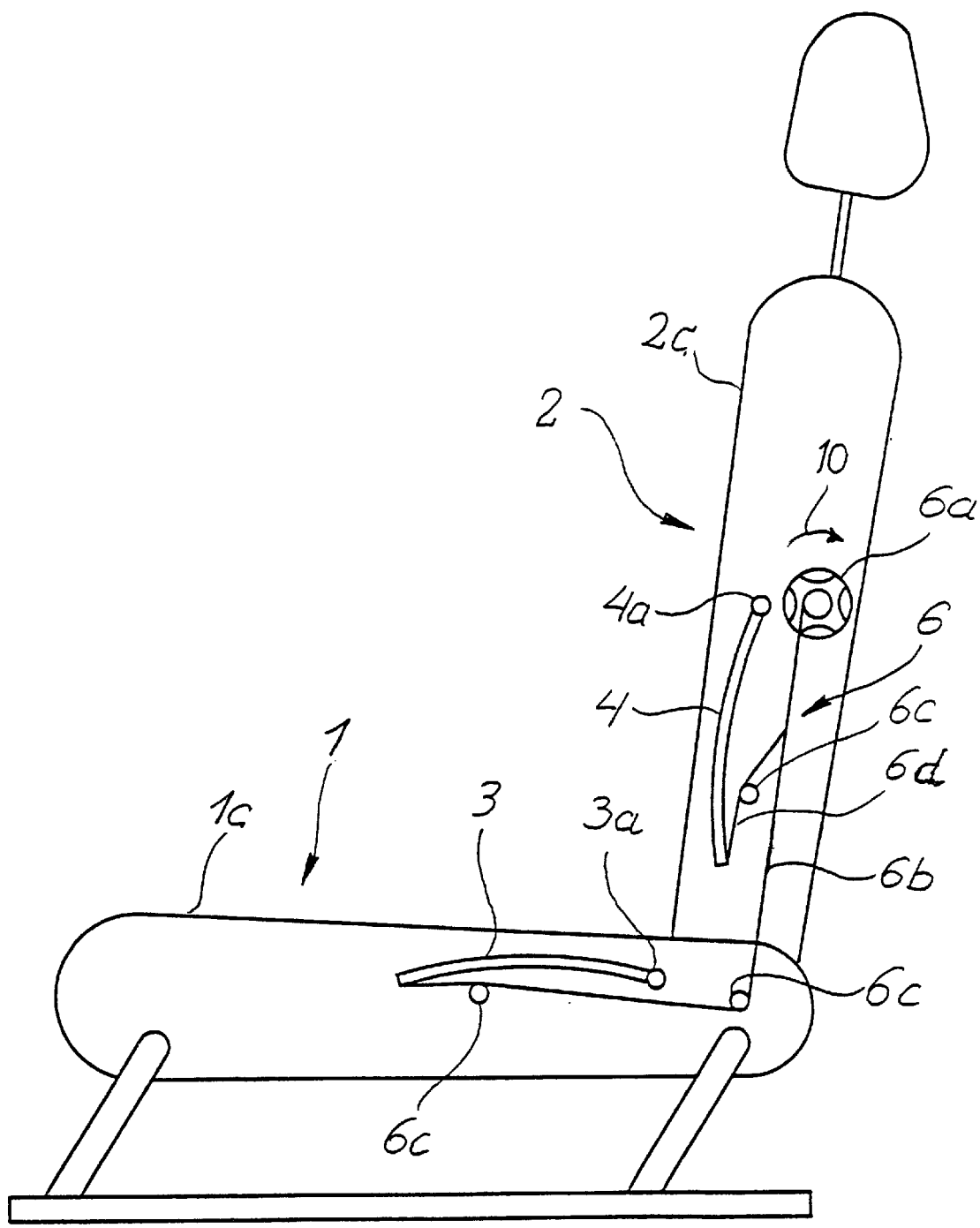
FIG. 2 shows a schematic view from the side or cross-sectional representation of a seat with supports shown slightly curved.
Figure 3:
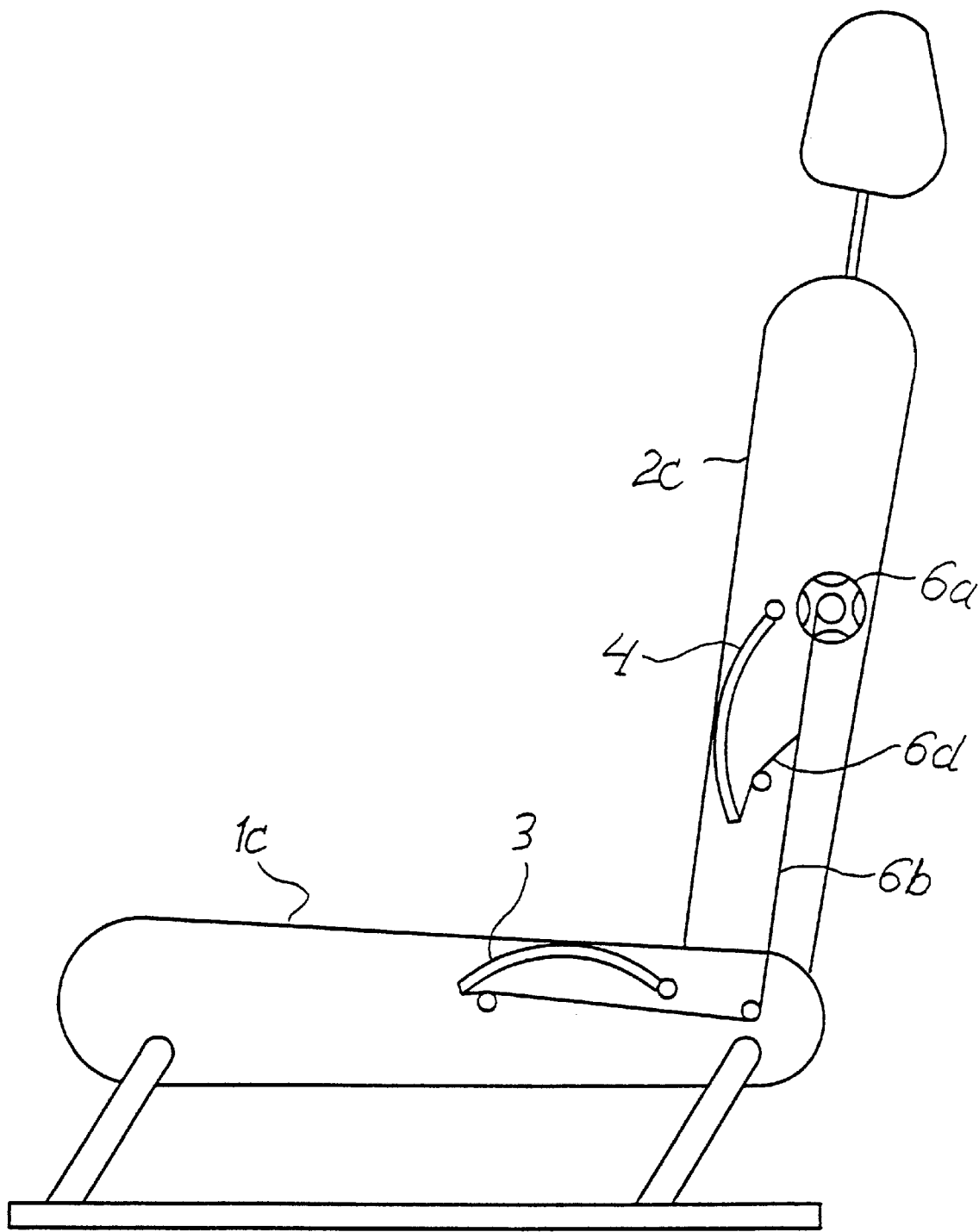
FIG. 3 shows a representation corresponding to FIG. 2, where the supports are very curved.

In the embodiment according to FIGS. 1 through 3, not only the pressure element 3 in the seat portion 1, but also the pressure element 4 in the backrest 2 are embodied as supports whose degree of curvature can be adjusted.

Figure 4:
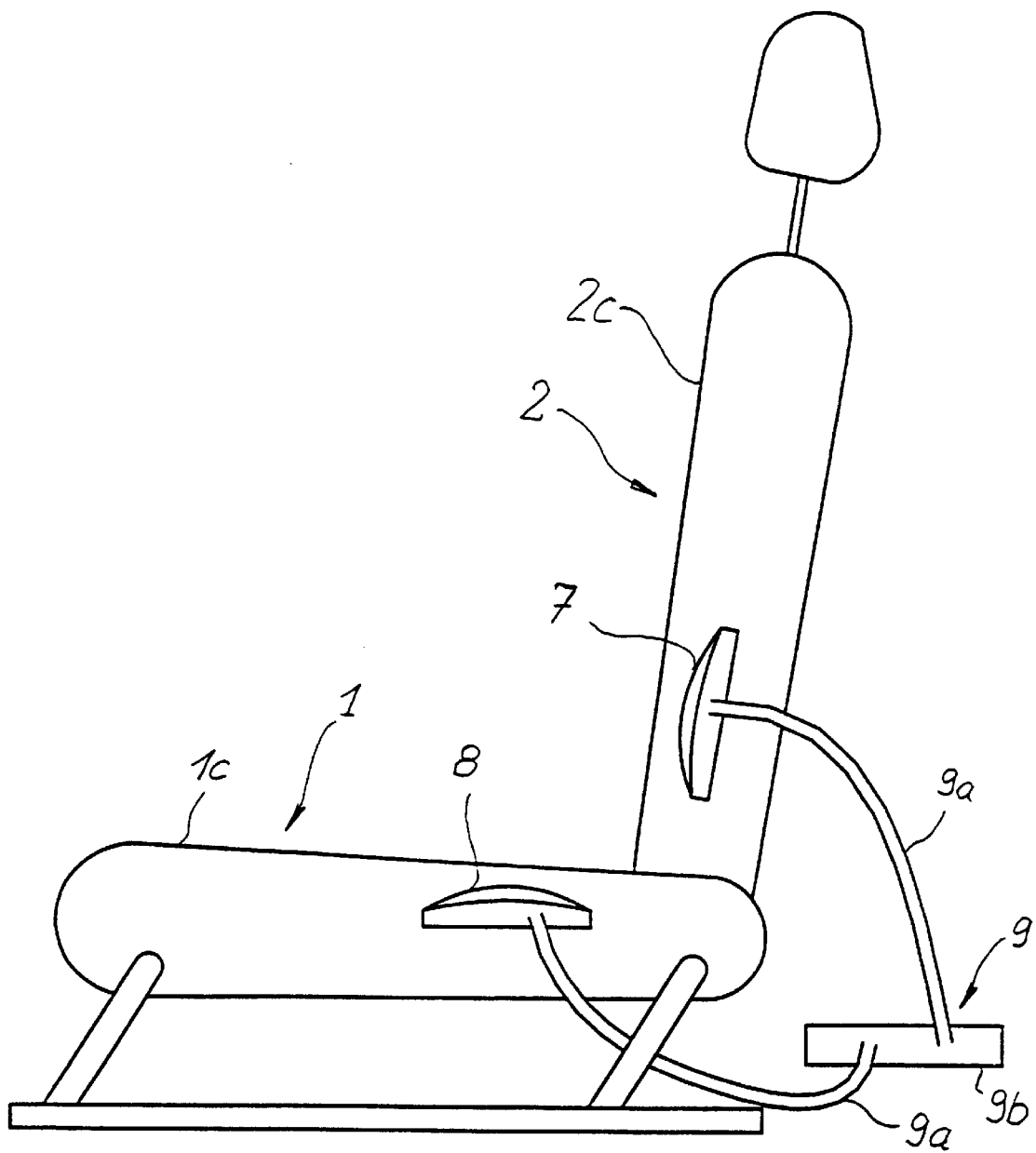
FIG. 4 shows a view corresponding to FIG. 2 of a second embodiment with pressure chambers.
Figure 5:
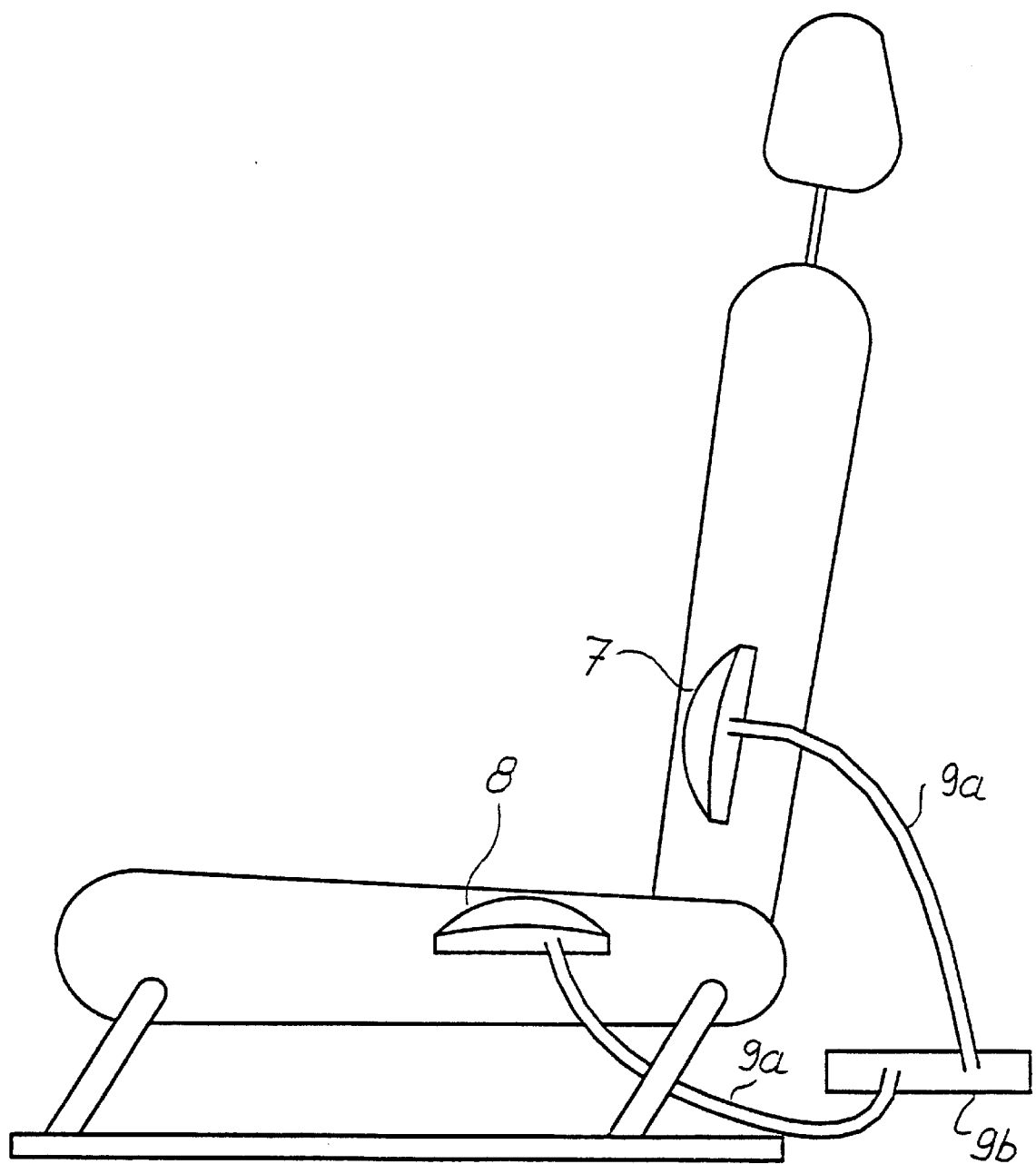
FIG. 5 shows a view corresponding to FIG. 4, with pressure chambers under increased pressure.

In the embodiments according to FIGS. 4 and 5, the pressure elements 8 in the seat portion and 7 in the backrest take the form of pressure chambers.

The pressure elements 3 and 4, which take the form of supports whose degree of curvature can be adjusted, are operated by means of a handwheel 6a (see FIGS. 2 and 3). At the same time, this handwheel operates two traction cables 6b and 6d. The traction cables 6b and 6d lead over deflection rollers 6c and engage one end of the pressure elements 3 and 4, respectively, which are embodied as supports whose degree of curvature is adjustable. At the opposite end, the pressure elements 3 and 4 are connected, via the joints 3a and 4a, respectively, with the weight-bearing structures of the seat and backrest, respectively. Turning the handwheel 6a in the direction shown by the arrow 10 according to FIG. 2 tightens the traction cables 6b and 6d, causing increased curvature of the pressure elements 3 and 4, as shown in FIG. 3. When the handwheel 6a is turned back the other way, the supports 3 and 4 stretch due to their intrinsic elasticity and resume their former less curved position according to FIG. 3.

The pressure elements 7 and 8, which can be operated by/with a fluid, preferably air, are embodied as pressure chambers whose firmness can be adjusted. This is accomplished by an adjusting device that allows a fluid, preferably air, to flow from a pressure source 9b through lines 9a into the pressure chamber in question. By changing the pressure in the pressure chambers, the firmness of the seat is adjusted in both the rear of the seat portion 1 and in the lordotic area of the backrest 2. The position of the rear of the seat portion 1 corresponds to the ischial tuberosity area of the seat's occupant.

When the pressure elements 3 and 4 or 7 and 8 are adjusted, there is a change in the distance between the seat cover 1c and the backrest cover 2c in relation to those areas of the pressure elements located closest to these two covers. When the pressure elements bulge out to a greater extent, there is, in a manner not indicated in the drawing, also a greater bulge in those areas of the upholstery and covers 1c and 2c located over them, either upwardly or toward the front, respectively.

A harmful error in adjustment is precluded by the coupling of the adjustment.

What is claimed is:

1. A seat having a seat portion and a backrest, with a pressure element located in a rear of the seat portion and another pressure element in a lordotic area of the backrest, for adjusting the firmness of the seat and, where applicable, the contour in the areas of the seat covering the pressure elements, wherein both pressure elements are adapted so that they can only be adjusted in tandem, and wherein the pressure elements are adapted to undergo adjustment in the same direction.

2. A seat according to claim 1, wherein the pressure elements consist of chambers that can be filled with a fluid, and whose filling pressure is adjustable.

3. A seat according to claim 2, wherein the fluid is air.

4. A seat according to claim 2, wherein the pressure elements are supports whose degree of curvature is adjustable.

5. A seat according to claim 1, wherein the area of the pressure elements located in the closest proximity to the seat cover can be adjusted towards or away from the seat cover.

6. A seat according to claim 5, wherein the pressure elements consist of chambers that can be filled with a fluid, and whose filling pressure is adjustable.

7. A seat according to claim 1, wherein the pressure elements are supports whose degree of curvature is adjustable.

8. A seat according to claim 7, wherein the area of the pressure elements located in the closest proximity to the seat cover can be adjusted towards or away from the seat cover.

* * * * *